United States Patent
Jenkines

(10) Patent No.: US 8,097,325 B2
(45) Date of Patent: Jan. 17, 2012

(54) POLYURETHANE CARPET BACKINGS MADE USING FATTY ACID AMIDE POLYOLS

(75) Inventor: Randall C. Jenkines, Dalton, GA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 11/579,573

(22) PCT Filed: Jun. 3, 2005

(86) PCT No.: PCT/US2005/019704
§ 371 (c)(1),
(2), (4) Date: Jun. 12, 2008

(87) PCT Pub. No.: WO2005/123798
PCT Pub. Date: Dec. 29, 2005

(65) Prior Publication Data
US 2008/0241458 A1    Oct. 2, 2008

(51) Int. Cl.
*B32B 33/00* (2006.01)
*D05C 15/00* (2006.01)
*D05C 17/02* (2006.01)

(52) U.S. Cl. .............. 428/97; 428/95; 156/72

(58) Field of Classification Search .......... 428/95, 428/97; 156/72
See application file for complete search history.

(56) References Cited

U.S. PATENT DOCUMENTS

| | | | |
|---|---|---|---|
| 4,296,159 A | | 10/1981 | Jenkines et al. |
| 4,551,517 A * | | 11/1985 | Herold et al. ............ 528/60 |
| 4,696,849 A | | 9/1987 | Mobley et al. |
| 4,966,920 A * | | 10/1990 | Gainer et al. ............ 521/99 |
| 6,096,401 A * | | 8/2000 | Jenkines ............ 428/95 |
| 6,171,678 B1 * | | 1/2001 | Holeschovsky et al. ....... 428/97 |
| 6,180,686 B1 * | | 1/2001 | Kurth ............ 521/51 |
| 6,465,569 B1 * | | 10/2002 | Kurth ............ 525/51 |
| 6,495,611 B1 * | | 12/2002 | Arlt et al. ............ 521/99 |
| 6,555,199 B1 * | | 4/2003 | Jenkines ............ 428/97 |
| 6,780,895 B2 * | | 8/2004 | Holechovsky et al. ....... 521/133 |
| 6,962,636 B2 * | | 11/2005 | Kurth et al. ............ 156/72 |
| 6,979,477 B2 * | | 12/2005 | Kurth et al. ............ 427/426 |
| 7,063,877 B2 * | | 6/2006 | Kurth et al. ............ 428/95 |
| 7,794,814 B2 * | | 9/2010 | Jenkines ............ 428/97 |
| 2002/0090488 A1 * | | 7/2002 | Kurth et al. ............ 428/95 |
| 2002/0119321 A1 * | | 8/2002 | Kurth et al. ............ 428/423.1 |
| 2002/0121328 A1 * | | 9/2002 | Kurth et al. ............ 156/72 |
| 2002/0192456 A1 | | 12/2002 | Mashburn et al. |
| 2003/0114627 A1 * | | 6/2003 | Holeschovsky et al. ....... 528/44 |
| 2005/0070620 A1 * | | 3/2005 | Herrington et al. ......... 521/155 |
| 2005/0282001 A1 * | | 12/2005 | Jenkines et al. ............ 428/323 |
| 2006/0193802 A1 * | | 8/2006 | Lysenko et al. ............ 424/65 |
| 2006/0276609 A1 * | | 12/2006 | Lysenko et al. ............ 528/44 |
| 2006/0293400 A1 * | | 12/2006 | Wiltz, Jr. et al. ............ 521/172 |
| 2007/0142544 A1 * | | 6/2007 | Jenkines et al. ............ 524/589 |
| 2008/0132134 A1 | | 6/2008 | Mashburn et al. |
| 2008/0241458 A1 * | | 10/2008 | Jenkines ............ 428/95 |
| 2008/0262259 A1 * | | 10/2008 | Luo et al. ............ 560/1 |
| 2009/0170972 A1 * | | 7/2009 | Sonney et al. ............ 521/88 |
| 2009/0197035 A1 * | | 8/2009 | Jenkines ............ 428/86 |
| 2009/0197984 A1 * | | 8/2009 | Bartelink et al. ............ 521/157 |

FOREIGN PATENT DOCUMENTS

| | | | |
|---|---|---|---|
| GB | 1 241 038 | | 7/1971 |
| GB | 1 247 671 | | 9/1971 |
| GB | 1248919 | A * | 10/1971 |
| WO | WO-03/078493 | A2 | 9/2003 |

\* cited by examiner

*Primary Examiner* — Cheryl Juska

(57) ABSTRACT

Polyurethane carpet backings are made using a polyurethane-forming composition that includes fatty acid amide polyols. The formulation allows a significant replacement of conventional polyols with polyols derived from annually renewable resources, while maintaining important properties like edge curl, tuftbind, viscosity and curing rates.

27 Claims, No Drawings

POLYURETHANE CARPET BACKINGS MADE USING FATTY ACID AMIDE POLYOLS

The invention relates to tufted or woven carpet having a polyurethane backing, and to methods of making such carpet.

Tufted carpets are manufactured by tufting fiber bundles through a primary backing and securing them to the primary backing with a precoat. The tufted carpets may also have additional layers such as a laminate layer, a secondary backing layer and a foam layer. Woven carpets are often manufactured similarly, except that the fiber bundles are woven through the primary backing.

The precoat anchors the fiber bundles to the primary backing, providing fiber lock properties like good pilling and fuzzing resistance, good tuftbind and good edge ravel. In addition, the precoat is usually called upon to contribute to other desirable attributes of the carpet such as dimensional stability, flame retardancy, antimicrobial/antifingal activity and liquid barrier functionality.

One type of precoat system is a polyurethane. Polyurethane precoat systems are described, for example, in U.S. Pat. No. 4,296,159 to Jenkines et al. and U.S. Pat. No. 4,696,849 to Mobley et al. The polyurethanes described in these patents are formed from a polyisocyanate and a polyol compound. The polyol compounds that are most widely used in polyurethane applications, including carpet precoats, are polyether or polyester polyols that are derived mainly from petroleum-based feedstocks. It is desirable to replace all or part of the conventional, petroleum-based polyols with an alternative polyol that is based on an annually renewable feedstock. Conventional polyol prices tend to fluctuate with crude oil pricing, which is becoming increasingly volatile due to dwindling proven reserves, increased global demand and an uncertain geopolitical climate. Further, many countries do not have domestic oil reserves, but have large agricultural industries that could produce vegetable oil feedstocks for making alternative polyols, if those polyols perform well from both technological and economical standpoints.

Most vegetable oils are mixtures of fatty acid triglycerides that do not have isocyanate-reactive functionality. It is therefore necessary to modify the triglycerides to introduce the needed functional groups. This is commonly accomplished by performing a transesterification reaction between a polyol compound and either the triglyceride itself or a fatty acid or fatty acid ester obtained from the triglyceride. This reaction creates compounds having one or two fatty acid ester groups and one or more free hydroxyl groups. In order to increase the hydroxyl functionality, the triglycerides or corresponding fatty acids can be "blown" or reacted with moist air to couple them.

These oil-based polyols seldom represent a drop-in replacement for the conventional, petroleum-based products in most polyurethane applications. There are a number of reasons for this. One problem is that it has been difficult to regulate the functionality (number of hydroxyl groups/molecule) in these oil-based polyols. Many vegetable oil-based polyols contain a significant fraction of molecules having zero or one isocyanate-reactive group. These molecules either do not react with the polyisocyanate at all, or else act as chain terminators that reduce the polymer molecular weight and crosslink density. Another problem is that the hydroxyl groups on vegetable oil-based polyols tend to be arranged differently than on conventional polyether and polyester polyols. The conventional polyols mostly have their hydroxyl groups located at the chain ends. Vegetable oil-based polyols as described above usually have closely spaced hydroxyl groups and a free hydrocarbon tail that is not isocyanate-reactive at one end. This leads to profound differences in the chain structure of the polyurethane.

Still another problem is that the vegetable oil-based polyols are mixtures of molecules that have significant variations in their structures. This leads to still further differences in the structure of the ensuing polyurethane, compared to polyurethanes made using conventional polyols. The variations can lead to unpredictability in the properties of the polyurethane. In addition, fatty acids contained in vegetable oils vary in terms of chain length, number and position of unsaturated sites and/or functional groups (such as hydroxyl groups), among the different types of vegetable oils and even within lots of a single type of oil. This variability introduces still more unpredictability in the performance of these polyols.

It has been suggested to use certain vegetable oil-based polyols to make carpet precoats. For example, US Published Patent Applications 2002/0121328, 2002/0119321 and 2002/0090488 suggest that certain transesterified "blown" vegetable oils be used as the polyol component of a tufted carpet precoat system. However, the suitability of these polyols to produce commercially acceptable carpet has not been established, except when used in relatively small amounts. The demands on a carpet precoat are particularly high, compared to many other types of polyurethane systems, as the precoat formulation must have adequate pot life and cure quickly (in order to obtain commercially viable line speeds), have a workable viscosity, provide good tuft-binding strength and produce a dimensionally stable carpet product, while being as inexpensive as possible.

Accordingly, it is desirable to produce a polyurethane precoat formulation for tufted or woven carpet, which provides an acceptable set of performance properties while replacing at least some of the conventional polyol materials with a vegetable oil- or animal fat-based polyol.

In one aspect, this invention is a carpet having a substantially noncellular polyurethane carpet backing, wherein the polyurethane is the reaction product of a polyisocyanate component and a polyol component containing a mixture of isocyanate-reactive materials wherein one or more optionally alkoxylated fatty acid amide polyols constitute about 5-70% by weight of the isocyanate-reactive materials.

In a second aspect, this invention is a carpet comprising (I) a primary backing, (II) a yarn tufted or woven through the primary backing thereby creating a yarn bundle on the underside of the resulting carpet, and (III) a polyurethane applied to the underside of the carpet thereby adhering the yarn bundle to the primary backing, wherein the polyurethane is the reaction product of a polyisocyanate component and a polyol component containing a mixture of isocyanate-reactive materials wherein one or more optionally alkoxylated fatty acid amide polyols constitute about 5-70% by weight of the isocyanate-reactive materials.

In another aspect, this invention is a method comprising (I) applying a polyurethane-forming composition to the underside of a carpet having a primary backing and a yarn tufted or woven through the primary backing to form a yarn bundle on the underside of the carpet and (II) curing the polyurethane-forming composition to form a polyurethane coating that adheres the yarn bundle to the primary backing, wherein the polyurethane-forming composition includes a polyisocyanate component and a polyol component containing a mixture of isocyanate-reactive materials wherein one or more optionally alkoxylated fatty acid amide polyols constitute from about 5-70% by weight of the isocyanate-reactive materials.

It has been surprisingly found that carpet meeting necessary standards of performance for commercial applications can be prepared in accordance with the invention, using a significant proportion of a polyol derived from annual renewable vegetable oil or animal fat.

The carpet includes a primary backing that defines multiple openings through which a facing fiber is tufted or woven to produce a carpet face. The primary backing is generally in the form of a woven or nonwoven scrim, and can be made of any convenient material, such as, for example, jute, polypropylene, nylon, a polyester, a polyacrylate, cotton, wool, or other material. The facing fiber also can be of any convenient material, such as wool, cotton, nylon, a polyester, an acrylic fiber, polypropylene, polyethylene, a blend of any two or more of these, or the like. The primary backing and the facing fiber should be stable under the conditions under which the polyurethane precoat is applied and cured, so the carpet does not degrade or become distorted. The facing fiber is typically in the form of fiber bundles that are tufted or woven through the primary backing to produce a carpet face and an opposing underside.

A polyurethane-forming composition is applied to the underside of the carpet to wet out the fiber bundles and adhere them to the primary backing. This is conveniently done by creating a puddle of the polyurethane-forming composition on the underside of the carpet and mechanically spreading the composition over the back surface. It is often convenient to froth the composition before applying it, as frothing makes it easier to control coating weight. It is preferred to use a doctor blade or similar apparatus to spread the polyurethane-forming composition, as this method mechanically pushes the polyurethane-forming composition into and between the fiber bundles and into contact with the primary backing, thereby improving the bond between the fibers and primary backing. Once applied and spread, the polyurethane-forming composition is allowed to cure to form a polyurethane polymer. This curing can occur at room temperature (~22° C.), but it is generally desirable to apply heat to accelerate the cure. A suitable curing temperature is from 100-200° C., such as from 110-150° C. It is desired that the curing temperature be such that the formulation cures to a tack-free state in 4 minutes or less, preferably 2.5 minutes or less and more preferably in 2 minutes or less.

The spreading and curing process generally will remove gasses entrapped in the polyurethane-forming composition if the composition is frothed prior to application, except if the composition contains a surfactant or other foam stabilizer. It is usually preferred that the precoat be non-cellular.

Care should be taken to minimize mechanical stresses on the carpet during the application and curing of the polyurethane precoat, as these stresses often lead to subsequent dimensional instability. The carpet is preferably stretched no more than 2% in either the weft (cross machine) or warp (machine) direction, and more preferably no more than 0.75%, during the precoating process. The carpet may be heated slightly prior to applying the polyurethane-forming composition. The carpet is preferably dry, as residual moisture can react with the polyisocyanate component of the polyurethane-forming composition to generate a gas. Gas generation leads to forming a cellular structure in the precoat or at the interface of the precoat and the carpet, which is generally undesirable.

The polyurethane-forming composition includes a polyisocyanate component and a polyol component. The polyisocyanate component includes at least one organic polyisocyanate, which may be a polymeric polyisocyanate, aromatic isocyanate, cycloaliphatic isocyanate, or aliphatic isocyanate. Examples of suitable polyisocyanates include m-phenylene diisocyanate, tolylene-2-4-diisocyanate, tolylene-2-6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), tolylene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2-4-diisocyanate, tolylene-2-6-diisocyanate or mixtures thereof. Diphenylmethane-4,4'-diisocyanate, diphenylmethane-2,4'-diisocyanate and mixtures thereof are generically referred to as MDI, and all can be used. Tolylene-2-4-diisocyanate, tolylene-2-6-diisocyanate and mixtures thereof are generically referred to as TDI, and all can be used. Polyisocyanate compounds or mixtures thereof having from about 1.8 to about 2.5 isocyanate groups/molecule, on average, are preferred, especially those having an average of about 1.9 to about 2.3 isocyanate-groups/molecule. Prepolymers made by reacting a stoichiometric excess of any of the foregoing polyisocyanates with an isocyanate-reactive compound such as those described below can be used as well.

The polyol component includes a mixture of isocyanate-reactive compounds. About 5-70%, such as about 25-60%, 30-55% or 40-50%, of the total weight isocyanate-reactive compounds is one or more fatty acid amide polyols. The fatty acid amide polyols are characterized in having an average of two or more hydroxyl groups per molecule and at least one amide (>N—C(O)—) group. They have a saturated or unsaturated $C_9$ or higher hydrocarbyl group bonded to the carbonyl carbon atom of the amide group. The hydrocarbyl group may contain, for example from 11-21 or from 13-19 carbon atoms. The hydrocarbyl group may be unsubstituted or substituted with inert substituents such as ether or halogen groups. A single hydrocarbyl group may be bonded to two or more amide groups or to another hydrocarbyl group via a linkage such as an ether, ester, or urethane group.

The fatty acid amide polyol can be prepared in the reaction of a fatty acid, or ester of a fatty acid, with a compound having a primary or secondary amino group and two or more hydroxyls. A preferred such compound, on the basis of low cost and ready availability, is an alkanolamine. The alkanolamine preferably has two or more hydroxyl groups. Suitable alkanolamine compounds include diethanolamine, diisopropanolamine, diisobutanolamine, mixtures thereof and the like. The amino group reacts with the acid or ester group of the fatty acid (or ester) to form the corresponding amide. The hydroxyl groups, being less reactive with the fatty acid or ester, tend not to react to any significant extent, so that the resulting amide compound contains free hydroxyl groups corresponding to those on the alkanolamine compound.

The fatty acid is conveniently derived from a vegetable oil or animal fat. Vegetable oils and animal fats are in large part triglycerides of a mixture of fatty acids. The fatty acid types vary with the particular plant or animal source, and may vary to some extent even within a particular animal or plant source. Fatty acids can be obtained by hydrolyzing the triglyceride to break the ester linkages and recover the fatty acid plus glycerine. Fatty acid esters can be obtained in a transesterification reaction between the oil or fat and a lower alcohol such as methanol or ethanol. A mixture of fatty acids is normally obtained, the composition of which is determined by the starting oil or fat. The fatty acids typically vary by chain length and number of unsaturation sites. Fatty acids derived from corn oil, soybean oil, canola oil, peanut oil, rapeseed oil, olive oil and the like are all useful. It is also within the scope of the invention (although less preferred) to use a so-called "blown" vegetable oil, which has been reacted with hot air to couple fatty acid groups together and thus form a larger, potentially higher functionality molecule.

A suitable process for preparing the amide is described, for example, in GB 1,248,919, incorporated herein by reference. In the process, from about 0.8 to about 2.5 moles of the amine compound are reacted per mole of fatty acid or ester. The reaction mixture is advantageously brought to an elevated temperature and preferably a reduced pressure for a period of about 15 minutes to 5 hours. Condensation products (water or lower alcohol) are preferably removed during the reaction to help drive the reaction. If desired, the reaction may be stopped before all of the fatty acid or ester is consumed, in which case the reaction product will contain a quantity of unreacted fatty acid or ester. It is preferred that at least 50% of the fatty acid or ester is consumed, such at least 60% at least 75%, at least 85% or at least 90%. Excess amine compound may be left in the amide, or removed if desired. If left in the product, it tends to decrease equivalent weight, increase functionality and increase reactivity.

The resulting amide compound typically contains a hydrocarbon tail corresponding to the fatty acid starting material, and hydroxyl groups having a spatial relationship to each other that is defined by the structure of the starting alkanolamine compound. The hydroxyl equivalent weight is generally in the range of 125-225, preferably about 150-200. When using the preferred dialkanolamine compounds, the hydroxyl groups on the amide are separated by 5-9 atoms. This separation can be increased if desired by alkoxylating the amide. Alkoxylation is conveniently performed by reacting the amide with an alkylene oxide such as ethylene oxide, propylene oxide and/or butylene oxide in the presence of a polymerization catalyst such as a strong base or a so-called double metal cyanide catalyst. Alkoxylation has the effect of increasing the hydroxyl equivalent weight and increasing the distance between the hydroxyl groups. It is preferred to alkoxylate the amide compound to a hydroxyl equivalent weight in the range of about 250-1000, especially from about 250-500, and particularly from about 250-375. Alkoxylation is preferably performed with ethylene oxide or propylene oxide, especially ethylene oxide when the resulting product has an equivalent weight of about 500 or less.

A commercially available amide material that is not alkoxylated is sold by Ele Corporation under the tradename PEL-SOY™. A grade of particular interest is PEL-SOY 744, which contains about 9-10% by weight added glycerine. A suitable ethoxylated amide material is also commercially available from Ele Corporation under the tradename PEL-AMID. Particularly suitable grades are PEL-AMID 676-A and PEL-AMID 676. Mixtures of alkoxylated and non-alkoxylated amides can be used. An example of such a mixture is sold as PEL-SOY 748, and is a mixture of the PEL-AMID 676 and PEL-SOY 744 materials.

The polyol component includes other isocyanate-reactive materials in addition to the amide compound. These other materials constitute up to 95% of the total weight of all isocyanate-reactive materials (including the amide materials described above). These other isocyanate-reactive materials include those having an average of 2-6, especially 2-3 isocyanate-reactive groups per molecule. The isocyanate-reactive groups are preferably primary or secondary hydroxyl groups, but may be amino groups or other isocyanate-reactive groups.

The additional isocyanate-reactive materials preferably include at least one polyol having a hydroxyl equivalent weight of at least 500, especially from about 500 to about 1500 and most preferably from about 800-1200. This polyol preferably has a nominal functionality of 2 to 3 and an actual functionality in the range of 1.8 to 3.0. The "nominal" functionality is the number of functional groups expected to be present on the polyol based on the composition of the starting materials. The actual functionality is sometimes somewhat lower, especially with polyether polyols which tend to contain some terminal unsaturation that reduces average functionality somewhat.

The additional high equivalent weight polyol may be a polyether polyol, such as a polymer of ethylene oxide, propylene oxide, tetrahydrofuran or butylene oxide, or a mixture of two or more of these. Particular suitable polyether polyols include polymers of propylene oxide, random copolymers of propylene oxide and ethylene oxide, especially those containing up to about 15% by weight randomly polymerized ethylene oxide, and oxyethylene-capped polymers of propylene oxide or propylene oxide-ethylene oxide random copolymers. These polyols are conveniently prepared by adding the corresponding alkylene oxide to an initiator material such as a low molecular weight compound containing two or more hydroxyl and/or primary or secondary amine groups.

Polyester polyols can also be used as an additional high equivalent weight polyol.

The additional high equivalent weight polyol will in general constitute from about 10 to about 80% of the total weight of the isocyanate-reactive materials. Preferably, it will constitute about 30-65% by weight, and especially from about 40-60% by weight of the isocyanate-reactive materials.

It is also within the scope of the invention to include a quantity of an optionally transesterified "blown" vegetable oil polyol in the polyol component. These materials are described, for example, in U.S. Pat. No. 6,180,686 and U.S. Published Patent Application 2002-0119321. These polyols are prepared by passing air through a vegetable oil to remove impurities and thicken it, producing a product having at least 0.7 OH groups/molecule. That product is optionally transesterified with a short chain polyol, especially an adduct of glycerine and a monosaccharide, to increase the hydroxyl functionality. These "blown" vegetable oil polyols may be blends of the transesterification product with unreacted short chain polyol. When used, these "Blown" vegetable oil polyols may constitute up from 1 to about 75% of the combined weight of the "blown" vegetable oil polyol and the fatty acid amine polyol described above. It preferably constitutes no more than about 30% by weight of all isocyanate-reactive materials. Although this invention is not limited to any theory, it is believed that these "blown" vegetable oil products tend to be somewhat acidic. The fatty acid amide polyols, on the other hand, tend to be somewhat basic, and the presence of the latter tends to raise the pH of the polyol mixture. It is further believed that by so raising the polyol pH, to about 7.5-9.5 in particular, a good combination of suitable reactivity and good physical properties can be achieved.

A chain extender is also preferably present in the polyol composition. For purposes of this invention, a chain extender is a material other than the amide discussed above, having two isocyanate-reactive groups/molecule and an equivalent weight per isocyanate-reactive group of from about 30 to 150. Chain extenders having two hydroxyl groups are preferred. Examples of suitable chain extenders include ethylene glycol, diethylene glycol, triethylene glycol, propylene glycol, dipropylene glycol, tripropylene glycol, 1,4-dimethylolcyclohexane, diethyltoluene diamine, 1,4-butane diol, 1,6-hexane diol, 1,3-propane diol, amine-terminated polyethers such as Jeffamine D-400 from Huntsman Chemical Company, amino ethyl piperazine, 2-methyl piperazine, 1,5-diamino-3- methyl-pentane, isophorone diamine, ethylene diamine, hexane diamine, hydrazine, piperazine, mixtures thereof and the like. Amine chain extenders can be blocked, encapsulated, or otherwise rendered less reactive. Chain extenders advantageously constitute up to about 20%, especially up to about 10% of the combined weight of all isocyanate-reactive materials.

It is also within the scope of the invention to include a crosslinker in the polyol composition. A crosslinker, for purposes of this invention, is a compound having three or more isocyanate reactive groups and an equivalent weight per isocyanate-reactive group of 150 or less. However, the use of crosslinkers is generally discouraged because their use tends to increase edge curl. Therefore, crosslinkers are most preferably eliminated or used in small quantities. The isocyanate-reactive groups may be hydroxyl, primary amine or secondary amine groups.

Preferably, the reactive ingredients (i.e., the polyisocyanates and isocyanate-reactive compounds) are selected so that collectively they have an average of about 1.8 to about 2.5, especially from about 1.8 to about 2.3, reactive groups per molecule. The somewhat low average functionality produces a polyurethane that is at most only lightly crosslinked, which promotes dimensional stability in the carpet, as evidenced by low edge curl values.

It is most preferred to select the reactive components and polyisocyanate index to provide a balanced overall functionality, such as described, for example, in U.S. Pat. No. 4,696,849. A particularly preferred average actual functionality for the isocyanate-reactive components is from 1.97 to 2.03. A particularly preferred isocyanate index is from 85 to about 125. It is also preferred that at least one high equivalent weight polyol containing at least 30% primary hydroxyl groups be included in the composition.

The polyurethane-forming composition preferably contains a filler, which reduces overall cost and may improve flame resistance and other physical properties. The filler advantageously constitutes from about 20 to about 80 percent, such from about 30 to about 70, 50-65 or 55-60 percent, of the total weight of the polyurethane-forming composition. Suitable fillers include talc, mica, montmorillonite, marble, milled glass granite, milled glass, calcium carbonate, aluminum trihydrate, carbon, aramid, silica, silica-alumina, zirconia, talc, bentonite, antimony trioxide, kaolin, coal-based fly ash and boron nitride.

The polyurethane-forming composition also preferably contains one or more catalysts, which promote the reaction of the polyisocyanate with the isocyanate-reactive materials. Suitable catalysts include tertiary amines, organometallic compounds, or mixtures thereof. Specific examples of these include di-n-butyl tin bis(mercaptoacetic acid isooctyl ester), dimethyltin dilaurate, dibutyltin dilaurate, dibutyltin diacetate, dibutyltin sulfide, stannous octoate, lead octoate, ferric acetylacetonate, bismuth carboxylates, triethylenediamine, N-methyl morpholine, like compounds and mixtures thereof. An amine-blocked tin (IV) catalyst, such as those described in U.S. Pat. No. 5,491,174, can be used. An amount of catalyst is advantageously employed such that a relatively rapid cure to a tack-free state can be obtained, while providing enough open time that the polyurethane composition can be dispensed and spread over the carpet back before curing. If an organometallic catalyst is employed, such a cure can be obtained using from about 0.01 to about 0.5 parts per 100 parts of the polyurethane-forming composition, by weight. If a tertiary amine catalyst is employed, the catalyst preferably provides a suitable cure using from about 0.01 to about 3 parts of tertiary amine catalyst per 100 parts of the polyurethane-forming composition, by weight. An amine type catalyst and an organometallic catalyst can be employed in combination.

Other additives may be used, including fire retardants, pigments, antistatic agents, reinforcing fibers, antioxidants, preservatives, acid scavengers, and the like. It is usually preferred not to include a blowing agent. Components are preferably dried so remove residual water. The polyurethane-forming composition preferably contains less than 0.1% by weight water, so as to avoid a gas-generating reaction with the polyisocyanate. In order to provide a non-cellular coating, it is preferred to eliminate or minimize the presence of surfactants and foam stabilizers. The elimination of these materials permits the formulation to be frothed in order to better control coating weight, while then allowing the entrapped gases to escape before the formulation is cured.

The polyurethane composition is conveniently formed into a blended polyol component, which includes all isocyanate-reactive materials, and a polyisocyanate component. The filler is typically blended into the polyol component. Catalysts may be added to either the polyol or polyisocyanate component (preferably the polyol component) or added as one or more separate streams. The amount of polyisocyanate used is conveniently sufficient to provide an isocyanate index, i.e. 100 times the ratio of NCO groups to isocyanate-reactive groups in the reaction mixture of from about 95 to about 140, preferably about 85 to 125, and especially from about 100 to 115.

A convenient coating weight is from about 20 to about 45 ounces/square yard (0.68-1.53 kg/m$^2$), and in particular from about 25-35 ounces per square yard (0.85-1.19 kg/m$^2$). At such coating weights, the precoated carpet advantageously exhibits a tuftbind, measured according to ASTM D1335, of at least 10 lb (4.5 kg), more preferably at least 13 lb (5.9 kg) and even more preferably at least 15 lb (6.8 kg). Normalized to coating weight, the tuftbind is advantageously at least 0.40 lb/ounce/square yard (5.38 m$^{-2}$), preferably at least 0.48 (6.46 m$^{-2}$) and more preferably at least about 0.52 kg/ounce/square yard (7 m$^{-2}$), with coating weights in the 25-35 ounce/square yard (0.85-1.19 kg/m$^2$) range. Wet tuftbind values are advantageously at least 5.5 lb (2.5 kg), more preferably at least 8.8 lb (4 kg) and even more preferably at least 11 lb (5 kg). Normalized to coating weight (for coating weights in the 25-35 ounces/square yard (0.85-1.19 kg/m$^2$) range), wet tuftbinds of at least 0.26 lb/ounce/square yard (3.5 n$^{-2}$), such as at least 0.35 (4.71 m$^{-2}$) or at least 0.40 kg/ounce/square yard (5.38 m$^{-2}$) are desirable. Wet tuftbind is measured according to ASTM D1335 after soaking the carpet sample in room temperature tap water for 20 minutes.

The precoated carpet desirably has an edge curl of no greater than 2.54 cm, preferably no greater than 1.8 cm, more preferably no greater than 1.3 cm and even more preferably no greater than 0.8 cm, in each of the machine and cross machine direction.

The precoated carpet also advantageously exhibits excellent pilling and fuzzing resistance and high edge ravel (such as greater than >0.8 kg, especially greater than 1.0 kg or greater than 1.1 kg on the test described below). The coated carpet preferably exhibits a "hand punch" (a measure of flexibility described below) of 13.6 kg or less. The precoated carpet also advantageously exhibits good flame retardancy, antimicrobial/antifungal activity, low 24-hour total volatile organic components (TVOC), good liquid barrier functionality as measured by the British spill passage test (United Kingdom Health Care Specifications Method E), and excellent chair caster resistance to backing delamination and zippering (measured according to the Feingerate Baumberg Roller Chair Testing Device, ASTM D6962).

The carpet of the invention may contain components in addition to those described above. Examples of these include a secondary backing, an attached foam cushion, a non-woven secondary fabric, a release layer, one or more moisture barrier layers, and the like. The precoat formulation described herein may be used to adhere any of these additional components to the carpet structure. For example, a secondary backing may be laid into the precoat layer prior to the curing step. Subsequent curing of the precoat layer will then bond the secondary backing to the carpet. It is possible to apply the precoat to the secondary backing first, and then bring the tufted or woven carpet into contact with the precoated secondary backing, followed by a curing step. However, this latter method often does not permit good penetration of the precoat into and around the fiber bundles, and tuftbind and other properties sometimes suffer as a result.

It is therefore preferred to separate the precoating and curing steps from steps that attach secondary backings and/or other components to the structure. Accordingly, in a preferred process, the precoat formulation of the invention is coated on the back of the carpet, spread so it penetrates through and between the tufted or woven fiber bundles, and cured. If it is then desired to use this polyurethane formulation (or another polyurethane formulation) as a lamination layer for attaching a secondary backing or other component, an additional polyurethane layer is then applied (atop the precoat layer or onto the other component), the carpet and other component are brought together, and the polyurethane is cured.

The carpet backings of the invention have particular applicability in the residential and commercial carpet industry as well as in carpeting for recreational use, such as boats, cars, patios, synthetic tuft, etc. A preferred practice is to use the precoat formulations of this invention as scrape-down unitary coatings for artificial or synthetic tuft for football fields, soccer fields and the like.

The following examples will illustrate the practice of the present invention in their preferred embodiments. All parts and percentages are by weight unless otherwise indicated. Unless stated otherwise, all molecular weights expressed herein are weight average molecular weight.

EXAMPLES

The following materials are employed in the Examples:

Fatty acid amide polyol A is a reaction product of soy fatty acids with diethanolamine that is ethoxylated to a hydroxyl number of 168 (approximately 3 moles of ethylene oxide/OH group). This material is commercially available from ELE Corporation as PEL-AMID 676-A.

Fatty acid amide polyol B is a reaction product of soy fatty acids with diethanolamine, blended with approximately 10% glycerine to a hydroxyl number of 440. This material is commercially available from ELE Corporation as PEL-SOY 744.

Fatty acid amide polyol C is a reaction product of soy fatty acids with diethanolamine that is ethoxylated to a hydroxyl number of 110. This material is commercially available from ELE Corporation as PEL-AMID 676.

Fatty acid amide polyol D is a blend of fatty acid amide polyols A and B. The blend has a hydroxyl number of 191.5.

Polyether Polyol A is a 3000 molecular weight, nominally trifunctional random copolymer of 92% propylene oxide and 8% ethylene oxide. It is available commercially as Voranol® 9137CD polyol from Dow Chemical.

Polyether Polyol B is a 2000 molecular weight, nominally difunctional polypropylene oxide). It is available commercially as Voranol® 9120A polyol from Dow Chemical.

Polyether Polyol C is a 2000 molecular weight, nominally difunctional poly(propylene oxide) end-capped with 12 percent ethylene oxide, available commercially as Voranol® 9287A polyol from Dow Chemical.

Calcium carbonate A is a quarried calcium carbonate ground such that 70 weight percent passes through a 325 mesh screen. It is available commercially as Georgia Marble D70 from Georgia Marble Company.

Coal Fly Ash A is a recovered filler from coal based power plants. It is available commercially from Boral Material Technologies, Inc. as Celceram™ PV14A.

Polyisocyanate A is a 50/50 blend of a 2.3 functional, 32%-NCO polymeric MDI and an MDI prepolymer (181 I.E.). 2,4'-MDI constitutes 14% of the total weight of the pure MDI in the polymeric MDI. The MDI prepolymer is made from dipropylene glycol, tripropylene glycol and a pure MDI containing 2.6 weight percent of the 2,4'-isomer. Polyisocyanate A is commercially available as Isonate®7594A isocyanate from Dow Chemical.

Catalyst A is a blend of 10% of a dibutyltin diisooctylmercaptoacetate delayed action catalyst, commercially available as Fomrez™ UL6 from General Electric Company, in Polyether Polyol C.

Catalyst B is a blend of 20% of an ethylene diamine-blocked dibutyl tin dimaleate catalyst in Polyether Polyol C, available as XUS14048.00 from The Dow Chemical Company.

Catalyst C is a blend of 20% dibutyltin dilaurate (Dabco™ T12, from Air Products and Chemicals, Inc.) in Polyether Polyol C.

Example 1

A polyol blend is prepared by mixing the following components:

| Ingredient | Parts By Weight |
| --- | --- |
| Fatty acid amide polyol A | 38 |
| Fatty acid amide polyol B | 3 |
| Polyether polyol A | 49.5 |
| Dipropylene Glycol | 9.5 |
| Calcium Carbonate A | 205 |

The compounded polyol blend is charged to a hold/run tank of a commercial scale carpet coater. In separate run tanks are charged Polyisocyanate A, Catalyst Blend A and Catalyst Blend B.

A tufted carpet designated Certificate Style 2680 (J&J Industries) is mounted with the facing side down on a tenter frame. Cross machine tension is adjusted so the carpet is stretched less than 0.75% in the cross machine direction.

To a 14 inch Oakes mixer are metered 17.03 kg/min compounded polyol blend, 3.40 kg/min polyisocyanate A, 54.5 g/min Catalyst Blend A, 81.6 g/min Catalyst Blend B, and compressed air.

The mechanically frothed precoat is deposited as a puddle on the reverse side of the carpet, and spread down into the exposed fiber bundles with a doctor blade. The carpet is then passed through a 135° C. oven at a rate that provides a residence time of 2 minutes during which time the precoat formulation degasses prior to cure.

The precoated carpet is allowed to condition for one day at ASTM D1335 conditions, and is tested for coating weight, hand, tuftbind, wet tuftbind, edge ravel and edge curl. Tuftbind is measured according to ASTM D1335. Wet tuftbind is measured according to ASTM D1335, after first immersing the sample in room temperature tap water for 20 minutes.

Edge curl is measured by first submerging three 2"×6' (5 cm×15 cm) carpet samples in room temperature water for 30 seconds. Excess water is shaken off the samples and they are placed face up on a flat surface. A panel is applied over the sample, leaving a 2"×2" (5 cm×5 cm) portion exposed. After 30 minutes, the distance from the flat surface to the underside of the outer exposed edge of the carpet sample is measured. The average of the three measurements is reported as the edge curl.

Hand punch is measured by a test that simulates the action of pushing the carpet into a corner during installation. A 9"×12" (21.6 cm×30.5 cm) sample of the carpet is conditioned at 50% relative humidity and 25° C. for two hours. The carpet is placed face up over a hollow cylinder with a 5.5" (14 cm) internal diameter. An Instron 4465 tensile tester is equipped with a 1 kN compression/extension load cell and a compression foot having a 2.25" (5.7 cm) outside diameter. The compression foot is then forced 0.65 inch (1.65 cm) into the carpet at a rate of 12 inches/minute (30 cm/minute). The force at 0.5 inch (1.27 cm) deflection is reported. The test is repeated three more times, with the carpet being reversed each time. "Hand" is the average of the four measurements.

Edge ravel is measured on samples conditioned at ~21° C. and ~50% humidity for 24 hours. Tuft rows are pulled from the sample until two complete rows are pulled out. About 1½-2 inches (4.5 cm) of a third row is pulled out, leaving the resulting partially pulled row otherwise attached to the carpet. The sample is placed in the lower jaw of an Instron 4465 tensile tester equipped with 100 lb (45 kg) tension cell, and the free end of the partially pulled tuft row is placed in the upper jaw. The jaws are then pulled apart at the rate of 10 inches (25.4 cm)/minute. The force is measured on three duplicate sample and the average reported as edge ravel.

Results are as given in Table 1.

TABLE 1

| Property | Result |
|---|---|
| Coating Weight, ounces/square yard (kg/m$^2$) | 34.1 (1.16) |
| Hand, lb. (kg) | 10.1 (4.59) |
| Tuftbind, lb. (kg) | 18.9 (8.59) |
| Tuftbind/coating weight, lb./ounces/sq. yd (m$^{-2}$) | 0.55 (7.4) |
| Wet tuftbind, lb. (kg) | 15.3 (6.95) |
| Wet tuftbind/coating weight, lb./ounces/sq. yd (m$^{-2}$) | 0.45 (6.0) |
| Wet tuftbind retention | 81% |
| Edge Ravel, lb. (kg) | 2.8 (1.27) |
| Wet Edge Ravel, lb. (kg) | 2.5 (1.13) |
| Edge Curl, inch (MD/CMD) (cm) | 0.1/0 (0.25/0) |

MD—machine direction;
CMD—cross machine direction.

The vegetable oil-based polyols constitute 39% of the isocyanate-reactive components, 25.5% of all reactive materials and 15.4% of the total weight of this polyurethane formulation. Despite the relatively high loading of vegetable oil-based polyols, the precoat provides excellent dry and wet tuftbind, edge ravel and edge curl properties. The formulation cures well in 2 minutes at 135° C.

Example 2

Five polyol blends are formed according to Table 2 below. The blends are mixed in a cup with catalysts and polyisocyanate as indicated in Table 2, immediately poured onto the reverse side of a Certificate Style 2680 (J&J Industries) tufted carpet, and spread into the exposed fiber bundles using a scraper blade. The carpet is then placed into a 135° C. oven for two minutes, checked for tackiness, and then cured for another four minutes at the same temperature. The lack of tackiness is determined by pressing a gloved finger into the precoat that is lying on top of the back of the carpet sample. The sample is considered tack free if no precoat polymer sticks to the gloved finger. The precoated carpet is allowed to condition for one day at ASTM conditions, and is tested for coating weight, hand, tuftbind, wet tuftbind, edge ravel and edge curl. Results are as given in Table 3.

TABLE 2

| | Example No. | | | | |
|---|---|---|---|---|---|
| Component | 2A | 2B | 2C | 2D | 2E |
| Fatty acid amide polyol A | 46 | 36.8 | 29.4 | 23.5 | 18.8 |
| Fatty acid amide polyol B | 0 | 9.2 | 16.6 | 22.5 | 27.2 |
| Polyether Polyol A | 45.5 | 47.8 | 49.6 | 51.1 | 52.3 |
| Dipropylene glycol | 8.5 | 6.2 | 4.4 | 2.9 | 1.7 |
| Calcium Carbonate A | 205 | 205 | 205 | 205 | 205 |
| Catalyst A | 0.45 | 0.45 | 0.45 | 0.45 | 0.45 |
| Water content (est.) | 0.06 | 0.06 | 0.06 | 0.06 | 0.06 |
| Polyisocyanate A | 58.27 | 58.27 | 58.36 | 58.30 | 58.26 |
| Amide polyol as % isocyanate-reactive materials | 43.8 | 43.8 | 43.8 | 43.8 | 43.8 |
| Amide polyol as % of reactants | 28.2 | 28.2 | 28.2 | 28.2 | 28.2 |
| Amide polyol as a % of formulation | 12.65 | 12.64 | 12.64 | 12.64 | 12.65 |

In Examples 2A-2E, the total weight of amide polyol is kept constant, although the relative proportion of fatty acid amide polyol B increases from Example 2A-2E. Because fatty acid amide polyol B contains a small amount of glycerine, its equivalent weight is lower than fatty acid amide polyol A. To keep the equivalent weight of the polyol component nearly constant, dipropylene glycol content is decreased from Example 2A-2E, and small increases in the amount of Polyether Polyol A are made.

TABLE 3

| | Example No. | | | | |
|---|---|---|---|---|---|
| Property | 2A | 2B | 2C | 2D | 2E |
| Filled polyol viscosity[1] | 8,250 | 14,250 | 16,650 | 18,800 | 21,600 |
| Tack free time, min.[2] | <2 | <2 | <2 | <2 | <2 |
| Coating Weight, ounces/square yard (kg/m$^2$) | 36.9 (1.26) | 27.3 (0.93) | 26.5 (0.90) | 28.8 (0.98) | 26.6 (0.90) |
| Hand, lb. (kg) | 6.3 (2.86) | 7.3 (3.32) | 8.9 (4.05) | 13.7 (6.23) | 13.6 (6.18) |
| Tuftbind, lb. (kg) | 15.1 (6.86) | 14.4 (6.55) | 14.8 (6.73) | 15.8 (7.18) | 13.0 (5.91) |

TABLE 3-continued

|  | Example No. | | | | |
|---|---|---|---|---|---|
| Property | 2A | 2B | 2C | 2D | 2E |
| Tuftbind/coating weight, lb/ounces/sq. yd (m$^{-2}$) | 0.41 (5.52) | 0.53 (7.13) | 0.56 (7.53) | 0.55 (7.40) | 0.49 (6.59) |
| Wet tuftbind, lb. (kg) | 9.6 (4.36) | 10.1 (4.55) | 10.2 (4.64) | 11.1 (5.05) | 11.6 (5.27) |
| Wet tuftbind/coating weight, (lb/ounces/sq. yd (m$^{-2}$) | 0.26 (3.50) | 0.37 (4.98) | 0.38 (5.11) | 0.39 (5.25) | 0.44 (5.92) |
| Wet tuftbind retention | 63.6 | 70.1 | 68.9 | 70.3 | 89.2 |
| Edge curl, in (mm) | 0 (0) | 0.3 (0.76) | 0.5 (1.25) | 0.7 (1.78) | 0.7 (1.78) |

[1]Brookfield Model RVDVE115 #6 spindle at 20 rpm, 20° C.
[2]At 130° C.

The data in Table 3 shows that various blends of fatty acid amide polyols can be used to make precoats having acceptable properties, in a highly filled formulation containing approximately 28% by weight of the amide polyols (exclusive of fillers). In particular, each of these examples provides a desirable combination of short tack free time, reasonable viscosity, high loading of soy-based polyols, tuftbind and edge curl. Tuftbind generally increases (normalized for coating weight) when more of the lower equivalent weight fatty acid amide polyol B is used. However, the higher functionality of that material contributes to increasing edge curl.

Example 3-4 and Comparative Samples A-C

Following the procedure described in Example 2, various soybean-based polyol materials are evaluated at the 18.9% level in a precoat formulation. Amounts of polyether polyol and dipropylene glycol are varied to provide the polyol components with nearly identical equivalent weights. The precoat formulations and results are as given in Tables 4 and 5.

TABLE 4

|  | Example/Comparative Sample No. | | | | |
|---|---|---|---|---|---|
| Component | 3 | 4 | A* | B* | C* |
| Fatty acid amide polyol A | 30 | 0 | 0 | 0 | 0 |
| Fatty acid amide polyol B | 0 | 30 | 0 | 0 | 0 |
| Blown Soybean Oil[1] | 0 | 0 | 30 | 0 | 0 |
| High Functionality Castor Oil[2] | 0 | 0 | 0 | 30 | 0 |
| Low Functionality Castor Oil[3] | 0 | 0 | 0 | 0 | 30 |
| Polyether Polyol B | 57.0 | 65.0 | 57.8 | 59.0 | 57.8 |
| Dipropylene glycol | 13.0 | 5.0 | 12.2 | 11.0 | 12.2 |
| Calcium Carbonate A | 205 | 205 | 205 | 205 | 205 |
| Catalyst A | 0.45 | 0.45 | 0.45 | 0.45 | 0.45 |
| Water content (est.) | 0.06 | 0.06 | 0.06 | 0.06 | 0.06 |
| Polyisocyanate A | 58.25 | 58.43 | 58.18 | 58.14 | 58.30 |
| Vegetable oil-based polyol as a % of isocyanate-reactive components | 30.0 | 30.0 | 30.0 | 30.0 | 30.0 |
| Vegetable oil-based polyol as a % of reactants | 18.9 | 18.9 | 18.9 | 18.9 | 18.9 |
| Vegetable oil-based polyol as a % of formulation | 8.25 | 8.25 | 8.25 | 8.25 | 8.25 |

[1]A 130-OH-number functional blown soy oil polyol transesterified with a blend of sucrose and glycerin, sold as SoyOyl ™ GC5N by Urethane Soy Systems Corporation. The amount of unreacted vegetable oil in this polyol reaction product is about 30 percent by weight.
[2]A 3.0-functional castor oil product.
[3]A castor oil chemically modified to reduce the hydroxyl functionality to about 1.7.

TABLE 5

|  | Example No. | | | | |
|---|---|---|---|---|---|
| Property | 3 | 4 | A* | B* | C* |
| Filled polyol Viscosity, cps[1] | 11,050 | 11,500 | 42,650 | 10,750 | 6,950 |
| Tack free time, min. | <2 | <2 | 4 | 2 | >6 |
| CoatingWeight, ounces/square yard (kg/m$^2$) | 30.6 (1.04) | 33.1 (1.13) | 37.5 (1.28) | 35.0 (1.19) | 34.4 (1.17) |
| Hand, lb. (kg) | 11.8 (5.36) | 14.6 (6.63) | 21.0 (9.54) | 17.5 (7.95) | 12.9 (5.86) |
| Tuftbind, lb. (kg) | 12.4 (5.45) | 17.3 (7.86) | 15.5 (7.05) | 22.7 (10.32) | 19.4 (8.64) |
| Tuftbind/coating weight, lb./ounces/sq. yd. (m$^{-2}$) | 0.41 (5.52) | 0.52 (7.00) | 0.41 (5.52) | 0.65 (8.74) | 0.56 (7.53) |
| Wet tuftbind, lb. (kg) | 8.0 (3.64) | 13.4 (5.91) | 12.6 (5.73) | 20.3 (9.23) | 19.0 (8.63) |
| Wet tuftbind/coating weight, lb./ounces/sq. yd. (m$^{-2}$) | 0.26 (3.50) | 0.40 (5.38) | 0.34 (4.57) | 0.58 (7.80) | 0.55 (7.40) |
| Wet tuftbind retention | 64.5 | 77.5 | 81.3 | 89.4 | 97.9 |
| Edge curl, MD/CMD, in. (cm) | 0/0 (0/0) | 0.5/0 (1.25/0) | 0.5/0 (1.25/0) | 1.0/0 (2.5/0) | 0.3/0 (0.75/0) |

[1]Brookfield Model RVDVE115 spindle #6 at 20 rpm and 20° C.

As shown in Table 5, the formulations containing the fatty acid amide polyol have moderate viscosities, and provide short tack free times, good tuftbind (both wet and dry, normalized for coating weight), and low edge curl. In Comparative Sample A, good tuftbind and edge curl are obtained, but the viscosity of the polyol blend is very high even at a moderate loading of the oil-based polyol. Comparative Sample A is very slow to cure, which means that oven times are increased, causing line speeds to be slower. This makes the formulation very difficult to process commercially. In Comparative Sample B, higher edge curl values are exhibited. This indicates that the carpet is more likely to be dimensionally unstable during and after commercial installation procedures. In Comparative Sample C, good viscosity, tuftbind and edge curl results are obtained, but curing rates are very slow. Comparative Sample C must be processed using higher temperatures, more catalyst and/or slow line speeds in order to be used on a commercial line. All of these variations increase processing costs.

Example 5 and Comparative Sample D

Following the procedure described in Example 2, a blown-soybean oil-based formulation (Comparative Sample D) is compared with a formulation of the invention (Example 5). Comparative Sample D represents an optimized system that attempts to maximize both blown soybean oil content and filler content while retaining minimally acceptable tuftbind. The precoat formulations and results are as given in Tables 6 and 7.

TABLE 6

| Ingredient | Example/Comparative Example No. | |
|---|---|---|
| | 5 | D |
| Fatty acid amide polyol D | 40 | 0 |
| Blown Soybean Oil[1] | 0 | 25 |
| Polyether polyol A | 49.5 | 0 |
| Polyether polyol C | 0 | 64.0 |
| Dipropylene Glycol | 9.5 | 5.5 |
| Tripropylene Glycol | 0 | 5.5 |
| Calcium Carbonate A | 205 | 160 |
| Catalyst A | 0.005 | 0.6 |
| Catalyst B | 0.3 | 0 |
| Catalyst C | 0 | 0.6 |
| Polyisocyanate A | 60.94 | 48.75 |
| Vegetable oil-based polyol as a % of isocyanate-reactive components | 40.4 | 25 |
| Vegetable oil-based polyol as a % of formulation | 25.5 | 16.8 |
| % Filler | 56.0 | 51.8 |

[1]See note 1, Table 4.

TABLE 7

| Property | Example No. | |
|---|---|---|
| | 5 | D* |
| Filled polyol Viscosity[1] | 12,400 | 9,900 |
| Tack free time, min. | 2.5 | 4 |
| Coating Weight, ounces/square yard (kg/m$^2$) | 33.2 (1.13) | 26.5 (0.90) |
| Hand, lb. (kg) | 16.0 (7.27) | 5.5 (2.5) |
| Tuftbind, lb. (kg) | 16.8 (7.63) | 9.5 (4.32) |
| Tuftbind/coating weight, lb/ounces/sq. yd. (m$^{-2}$) | 0.51 (6.86) | 0.36 (4.84) |
| Wet tuftbind, lb. (kg) | 13.4 (6.09) | 7.2 (3.27) |
| Wet tuftbind/coating weight, lb/ounces/sq. yd. (m$^{-2}$) | 0.40 (5.38) | 0.27 (3.63) |
| Wet tuftbind retention | 79.8 | 75.8 |
| Edge Ravel, lb. (kg) | 2.1 (0.95) | 1.5 (0.68) |
| Wet Edge Ravel lb. (kg) | 1.5 (0.68) | 1.1 (0.50) |
| Edge curl, MD in. (cm) | 0.3 | 0.2 |

[1]Brookfield Model RVDVE115 spindle #6 at 20 rpm and 20° C.

Example 5 shows superior dry and wet tuftbind, both as absolute and weight-normalized values, and also exhibits a much faster cure, as compared with Comparative Sample D. These improvements are achieved while at the same time permitting a higher loading of vegetable-oil based polyol and of filler.

Examples 6-9 and Comparative Sample E

Following the procedure described in Example 2, a blown-soybean oil-based formulation (Comparative Sample E) is compared with formulations of the invention (Examples 6-8) in which the blown-soybean oil polyol and fatty acid amide polyol are used in various proportions. The precoat formulations and results are as given in Tables 8 and 9.

TABLE 8

| Ingredient | Example/Comparative Example No. | | | | |
|---|---|---|---|---|---|
| | E* | 6 | 7 | 8 | 9 |
| Fatty acid amide polyol D | 0 | 10.0 | 20.0 | 30.0 | 41.0 |
| Blown Soybean Oil[1] | 40.0 | 30.0 | 20.0 | 10.0 | 0 |
| Polyether polyol A | 25.0 | 25.0 | 25.0 | 25.0 | 25.0 |
| Polyether polyol B | 20.0 | 22.0 | 23.0 | 24.0 | 24.5 |
| Dipropylene Glycol | 15.0 | 13.0 | 12.0 | 11.0 | 9.5 |
| Coal Fly Ash A | 200 | 200 | 200 | 200 | 200 |
| Catalyst A | 0.45 | 0.45 | 0.45 | 0.45 | 0.45 |
| Polyisocyanate A | 57.3 | 56.5 | 58.5 | 60.3 | 61.4 |

[1]A 50-OH-number functional blown soy oil polyol transesterified with a blend of sucrose and glycerin, sold as SoyOyl ™ R2-052 by Urethane Soy Systems Corporation. The amount of unreacted vegetable oil in this polyol reaction product is about 20 percent by weight.

TABLE 9

| Property | D* | 6 | 7 | 8 | 9 |
|---|---|---|---|---|---|
| Polyol blend pH | 5.2 | 7.3 | 7.9 | 8.5 | 9.1 |
| Filled polyol Viscosity[1] | 8759 | 7500 | 6500 | 5100 | 3000 |
| Tack free time, min. | 3 | 2/75 | 2.5 | 2.25 | 1.5 |
| Gel time, min.[2] | 9.5 | 6.75 | 5.75 | 4.75 | 2 |
| Coating Weight, ounces/square yard (kg/m$^2$) | 28.7 (0.98) | 27.4 (0.99) | 29.5 (1.00) | 29.6 (1.01) | 30.0 (1.02) |
| Hand, lb. (kg) | 15.2 (6.9) | 14.6 (6.6) | 15.7 (7.1) | 15.5 (7.0) | 8.2 (3.7) |
| Tuftbind, lb. (kg) | 14.4 (6.5) | 13.8 (6.3) | 15.6 (7.1) | 19.2 (8.7) | 14.3 (6.5) |
| Tuftbind/coating weight, lb/ounces/sq. yd. (m$^{-2}$) | 0.5 (6.7) | 0.5 (6.7) | 0.5 (6.7) | 0.5 (6.7) | 0.3 (4.2) |
| Wet tuftbind, lb. (kg) | 12.2 (5.5) | 11.1 (5.0) | 11.4 (5.2) | 12.7 (5.8) | 10.5 (4.8) |
| Wet tuftbind/coating weight, lb/ounces/sq. yd. (m$^{-2}$) | 0.4 (5.4) | 0.4 (5.4) | 0.4 (5.4) | 0.4 (5.4) | 0.35 (4.7) |
| Wet tuftbind retention | 84.7 | 80.4 | 73.1 | 66.1 | 73.4 |

[1] Brookfield Model RVDVE115 spindle #6 at 20 rpm and 20° C.
[2] Time after mixing the polyol side with the polyisocyanate until the reaction mixture achieves a viscosity of 20,000 cps as measured using a Brookfield Model RVDVE115 spindle #6 at 20 rpm and 20° C.

Examples 6-9 show that when the fatty acid amide polyol is blended with the blown soy polyol, substantial improvements in gel and tack free time are seen, and properties of the resultant carpet are comparable.

From the foregoing, it will be observed that numerous variations and modifications may be effected without departing from the true spirit and scope of the novel concepts of the invention.

What is claimed is:

1. A carpet having a substantially noncellular polyurethane carpet backing, wherein the polyurethane comprises from about 20-80 percent by weight of a filler and is the reaction product of a polyisocyanate component and a polyol component containing the filler and a mixture of isocyanate-reactive materials wherein one or more optionally alkoxylated fatty acid amide polyols constitute about 5-70% by weight of the isocyanate-reactive materials, wherein the filler is at least one of talc, mica, montmorillonite, marble, milled glass granite, milled glass, calcium carbonate, aluminum trihydrate, carbon, aramid, silica, silica-alumina, zirconia, talc, bentonite, antimony trioxide, kaolin, coal-based fly ash and boron nitride, and wherein the polyol component has a viscosity of about 11,500 cps or less at 20° C.

2. A carpet comprising (1) a primary backing, (II) a yarn tufted or woven through the primary backing thereby creating a yarn bundle on the underside of the resulting carpet, and (III) a polyurethane applied to the underside of the carpet thereby adhering the yarn bundle to the primary backing, wherein the polyurethane comprises from about 20-80 percent by weight of a filler and is the reaction product of a polyisocyanate component and a polyol component containing the filler and a mixture of isocyanate-reactive materials wherein one or more optionally alkoxylated fatty acid amide polyols constitute about 5-70% by weight of the isocyanate-reactive materials, and wherein the polyol component has a viscosity of about 11,500 cps or less at 20° C.

3. The carpet of claim 2, wherein the fatty amide polyol is an optionally alkoxylated reaction product of a fatty acid or fatty acid ester and a compound having a primary or secondary amino group and two or more hydroxyl groups, and wherein the filler is at least one of talc, mica, montmorillonite, marble, milled glass granite, milled glass, calcium carbonate, aluminum trihydrate, carbon, aramid, silica, silica-alumina, zirconia, talc, bentonite, antimony trioxide, kaolin, coal-based fly ash and boron nitride.

4. The carpet of claim 3, wherein the fatty amide polyol is an optionally alkoxylated reaction product of a fatty acid and a dialkanolamine.

5. The carpet of claim 4, wherein the fatty amide polyol has a $C_{11-21}$ hydrocarbyl group bonded to the carbon atom of the amide group.

6. The carpet of claim 2, wherein the fatty acid amide polyol has a hydroxyl equivalent weight of from about 125-1000.

7. The carpet of claim 2, wherein the fatty acid amide polyol is alkoxylated and has a hydroxyl equivalent weight of 250-500.

8. The carpet of claim 2, wherein the fatty acid amide polyol(s) constitute about 25-60% by weight of the isocyanate-reactive materials.

9. The carpet of claim 8, wherein the fatty acid amide polyol(s) constitute about 30-55% by weight of the isocyanate-reactive materials.

10. The carpet of claim 2, wherein the isocyanate-reactive materials include a high equivalent weight polyol, and wherein the filler is at least one of talc, mica, montmorillonite, marble, milled glass granite, milled glass, calcium carbonate, aluminum trihydrate, carbon, aramid, silica, silica-alumina, zirconia, talc, bentonite, antimony trioxide, kaolin, coal-based fly ash and boron nitride.

11. The carpet of claim 10, wherein the high equivalent weight polyol is a polyether polyol.

12. The carpet of claim 2, wherein the isocyanate-reactive materials include a chain extender.

13. The carpet of claim 2, wherein the polyisocyanate component and the isocyanate-reactive component are each devoid of a surfactant or foam stabilizer.

14. The carpet of claim 2, further comprising a secondary backing.

15. The carpet of claim 14, wherein the secondary backing is adhered to the carpet with a polyurethane.

16. The carpet of claim 15, wherein the polyurethane that adheres the secondary backing to the carpet is the reaction product of a polyisocyanate component and a polyol component containing a mixture of isocyanate-reactive materials wherein one or more optionally alkoxylated fatty acid amide polyols constitute about 5-70% by weight of the isocyanate-reactive materials.

17. A method comprising (1) applying a polyurethane-forming composition to the underside of a carpet having a primary backing and a yarn tufted or woven through the primary backing to form a yarn bundle on the underside of the carpet and (II) curing the polyurethane-forming composition to form a polyurethane coating that adheres the yarn bundle to the primary backing, wherein the polyurethane-forming composition includes from about 20-80 percent by weight of a filler, a polyisocyanate component, and a polyol component containing the filler and a mixture of isocyanate-reactive materials wherein one or more optionally alkoxylated fatty acid amide polyols constitute from about 5-70% by weight of the isocyanate-reactive materials, and wherein the filler comprises at least one of talc, mica, montmorillonite, marble, milled glass granite, milled glass, calcium carbonate, aluminum trihydrate, carbon, aramid, silica, silica-alumina, zirconia, talc, bentonite, antimony trioxide, kaolin, coal-based fly ash and boron nitride, and wherein the polyol component has a viscosity of about 11,500 cps or less at 20° C.

18. The method of claim 17 wherein the fatty amide polyol is an optionally alkoxylated reaction product of a fatty acid or fatty acid ester and a compound having a primary or secondary amino group and two or more hydroxyl groups.

19. The method of claim 18, wherein the fatty amide polyol is an optionally alkoxylated reaction product of a fatty acid and a dialkanolamine.

20. The method of claim 19, wherein the fatty amide polyol has a $C_{11-21}$ hydrocarbyl group bonded to the carbon atom of the amide group.

21. The method of claim 20, wherein the fatty acid amide polyol is alkoxylated and has a hydroxyl equivalent weight of 250-500.

22. The method of claim 17 wherein the isocyanate-reactive materials include a high equivalent weight polyol.

23. The method of claim 22, wherein the high equivalent weight polyol is a polyether polyol.

24. The method of claim 17, wherein the polyisocyanate component and the isocyanate-reactive component are each devoid of a surfactant or foam stabilizer.

25. The method of claim 17, further comprising the step of adhering a secondary backing to the carpet.

26. The method of claim 25, wherein the secondary backing is adhered to the carpet by applying layer of a polyurethane-forming composition between the carpet and the secondary backing, and curing the polyurethane.

27. The method of claim 25, wherein the polyurethane composition applied between the carpet and secondary backing includes a polyisocyanate component and a polyol component containing a mixture of isocyanate-reactive materials wherein one or more optionally alkoxylated fatty acid amide polyols constitute from about 5-70% by weight of the isocyanate-reactive materials.

* * * * *